US009182998B2

(12) United States Patent
Inbaraj

(10) Patent No.: US 9,182,998 B2
(45) Date of Patent: Nov. 10, 2015

(54) REMOTE BIOS UPDATE IN SYSTEM HAVING MULTIPLE COMPUTERS

(71) Applicant: AMERICAN MEGATRENDS, INC., Norcross, GA (US)

(72) Inventor: Joseprabu Inbaraj, Lawrenceville, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 210 days.

(21) Appl. No.: 14/135,334

(22) Filed: Dec. 19, 2013

(65) Prior Publication Data
US 2015/0178096 A1 Jun. 25, 2015

(51) Int. Cl.
*G06F 9/00* (2006.01)
*G06F 9/44* (2006.01)
*G06F 9/445* (2006.01)
*G06F 15/177* (2006.01)

(52) U.S. Cl.
CPC ............... *G06F 9/4416* (2013.01); *G06F 8/65* (2013.01)

(58) Field of Classification Search
CPC ................................ G06F 8/65; G06F 9/4416
USPC .................. 713/1, 2; 717/168, 171, 174, 176
See application file for complete search history.

(56) References Cited

U.S. PATENT DOCUMENTS

| 7,360,074 | B2 * | 4/2008 | Chan | G06F 8/65 713/1 |
| 7,406,591 | B2 * | 7/2008 | Rothman | G06F 9/4416 713/2 |
| 7,917,743 | B2 * | 3/2011 | Martinez | G06F 9/4416 713/1 |
| 2004/0024917 | A1 * | 2/2004 | Kennedy | G06F 9/4406 710/1 |
| 2006/0020845 | A1 * | 1/2006 | Broyles, III | G06F 11/1417 714/2 |
| 2006/0143263 | A1 * | 6/2006 | Kumar | G06F 8/65 709/201 |
| 2009/0037722 | A1 * | 2/2009 | Chong | G06F 1/24 713/2 |

* cited by examiner

*Primary Examiner* — Mark Connolly
(74) *Attorney, Agent, or Firm* — Locke Lord LLP; Tim Tingkang Xia, Esq.

(57) ABSTRACT

Aspects of the present disclosure direct to remote BIOS update in a system having multiple host computers with service processors (SP). A remote management computer generates an ISO image for the host computer to perform a preboot execution environment (PXE) booting process to update the BIOS image. The ISO image includes a BIOS image and a flasher utility. Then the SP generates a first boot sequence change instruction for the host computer. The executed host computer, based on the boot sequence change instruction, changes the boot sequence data to perform the PXE booting process with the ISO image at the remote management computer. Then the SP reboots the host computer. The host computer boots from the ISO image by PXE booting, and executes the flasher utility of the ISO image to update the current BIOS image stored in the BIOS chip with the BIOS image of the ISO image.

25 Claims, 7 Drawing Sheets

REMOTE BIOS UPDATE IN SYSTEM HAVING MULTIPLE COMPUTERS

FIELD

The present disclosure relates generally to basic input/output system (BIOS) update of a host computer with a service processor (SP), and particularly to remote BIOS update in a system having multiple host computers with SP's.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Basic Input/Output System (BIOS) is one of the most crucial components on a computer motherboard. The BIOS firmware is preloaded into a memory (the BIOS memory) of the BIOS, and typically is the first code run by a computer when powered on. When the computer starts up, the first job for the BIOS is the power-on self-test, which initializes and identifies the system devices such as the CPU, RAM, video display card, keyboard and mouse, hard disk drive, optical disc drive and other hardware. The BIOS then locates a boot loader software held on a peripheral device (designated as a "boot device"), such as a hard disk or a CD/DVD, and loads and executes that software, giving it control of the operating system (OS). This process is known as booting, or booting up, which is short for bootstrapping.

The BIOS memory for storing the BIOS firmware is generally a non-volatile chip, such as an EEPROM chip on the motherboard. Typically, a serial peripheral interface (SPI) bus is used for the EEPROM chip. In modern computer systems, contents stored in the BIOS chip can be rewritten without removing it from the motherboard, allowing the BIOS firmware to be upgraded in place. The rewriting process of the BIOS firmware is generally referred to as flashing the BIOS.

Generally, a service processor (SP) or a baseboard management controller (BMC) refers to a specialized microcontroller that manages the interface between system management software and platform hardware. The SP can be embedded on the motherboard of a computer, generally a server. For example, different types of sensors can be built into the computer system, and the SP reads these sensors to obtain parameters such as temperature, cooling fan speeds, power status, operating system (OS) status, etc. The SP monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again. The SP also provides out-of-band (OOB) access to the BIOS.

In a host computer provided with a SP, the SP can be used for flashing the BIOS. However, in a system having multiple host computers, updating the BIOS for each computer is a challenge because it involves physical presence and sequential updating actions for each computer. There is a need to control the BIOS update process for all of the host computers in the system.

Therefore, an unaddressed need exists in the art to address the aforementioned deficiencies and inadequacies.

SUMMARY

Certain aspects of the present disclosure direct to a system, which includes a host computer and a service processor (SP). The host computer includes a basic input/output system (BIOS) chip storing a current BIOS image and boot sequence data. The SP includes a processor, a non-volatile memory and a system interface, and connected to the host computer via the system interface. The non-volatile memory stores computer executable codes. The codes, when executed at the processor, are configured to receive a first notification from a remote management computer indicating that an ISO image exists at the remote management computer for the host computer to perform a remote booting process, wherein the host computer and the SP are respectively connected to the remote management computer via a network, and wherein the ISO image includes a BIOS image and a flasher utility; in response to the first notification, generate a first boot sequence change instruction, and send the first boot sequence change instruction to the host computer, such that the host computer changes the boot sequence data stored in the BIOS chip based on the first boot sequence change instruction to perform the remote booting process with the ISO image from the remote management computer; and generate a first reboot command to reboot the host computer, and send the reboot command to the host computer, such that the host computer reboots based on the first reboot command and performs the remote booting with the ISO image to execute the flasher utility to of the ISO image to update the current BIOS image stored in the BIOS chip with the BIOS image of the ISO image.

In certain embodiments, the system interface is a standardized interface under an Intelligent Platform Management Interface (IPMI) standard. In certain embodiments, the standardized interface includes a keyboard controller style (KCS) interface, a system management interface chip (SMIC) interface, and a block transfer (BT) interface.

In certain embodiments, the system interface is a universal serial bus (USB) interface.

In certain embodiments, the SP is a baseboard management controller (BMC).

In certain embodiments, the codes are configured to send the first boot sequence change instruction to the host computer by: generating a first IPMI OEM message comprising the first boot sequence change instruction; and sending the first IPMI OEM message to the host computer through the system interface.

In certain embodiments, the codes are configured to send the first reboot command to the host computer by: generating a second IPMI OEM message comprising the first reboot command; and sending the second IPMI OEM message to the host computer through the system interface.

In certain embodiments, the remote management computer is configured to discover the host computer and the SP, select the BIOS image and the flasher utility based on information of the host computer, and generate the ISO image comprising the BIOS image and the flasher utility, and generate the first notification, and send the first notification to the SP.

In certain embodiments, the host computer further includes: a storage device storing an operating system (OS); a memory; and a central processing unit (CPU), configured to load a copy of the current BIOS image from the BIOS chip to the memory and execute the current BIOS image as an executed BIOS. The executed BIOS, when executed at the CPU, is configured to boot from a bootable device identified by the boot sequence data, receive the first boot sequence change instruction from the SP, change the boot sequence data based on the first boot sequence change instruction to identify a virtual remote booting media as the bootable device, wherein the virtual remote booting media is configured to perform the remote booting process, receive the first reboot command from the SP, reboot the host computer based on the first reboot command, and perform the remote booting process, and generate a completion signal when the remote booting process is complete, and send the completion signal to the remote management computer via the network.

In certain embodiments, prior to receiving the first boot sequence change instruction from the SP, the boot sequence data identifies the storage device as the bootable device.

In certain embodiments, the remote management computer is configured to receive the completion signal from the host computer via the network, and in response to the completion signal, generate a second notification indicating the remote booting process being complete, and send the second notification to the SP via the network.

In certain embodiments, the codes are further configured to receive the second notification from the remote management computer, and in response to the second notification, generate a second boot sequence change instruction, and send the second boot sequence change instruction to the host computer, such that the host computer changes the boot sequence data to identify the storage device as the bootable device.

In certain embodiments, the executed BIOS is further configured to receive the second boot sequence change instruction, and change the boot sequence data based on the second boot sequence change instruction to identify the storage device as the bootable device.

In certain embodiments, the remote booting process is a preboot execution environment (PXE) booting process.

Certain aspects of the present disclosure direct to a method of remotely update a current basic input/output system (BIOS) image of a host computer, which includes: receiving, at a service processor (SP), a first notification from a remote management computer indicating that an ISO image exists at the remote management computer for the host computer to perform a remote booting process, wherein the host computer and the SP are respectively connected to the remote management computer via a network, and wherein the ISO image comprises a BIOS image and a flasher utility; in response to the first notification, generating, at the SP, a first boot sequence change instruction, and sending the first boot sequence change instruction to the host computer, such that the host computer changes boot sequence data stored in the current BIOS image based on the first boot sequence change instruction to perform the remote booting process with the ISO image from the remote management computer; and generating, at the SP, a first reboot command to reboot the host computer, and send the reboot command to the host computer, such that the host computer reboots based on the first reboot command and performs the remote booting with the ISO image to execute the flasher utility to of the ISO image to update the current BIOS image with the BIOS image of the ISO image.

In certain embodiments, the SP is a baseboard management controller (BMC).

In certain embodiments, the host computer includes: a storage device storing an operating system (OS); a BIOS chip storing the current BIOS image and the boot sequence data; a memory; and a central processing unit (CPU), configured to load a copy of the current BIOS image from the BIOS chip to the memory and execute the current BIOS image as an executed BIOS. The executed BIOS, when executed at the CPU, is configured to boot from a bootable device identified by the boot sequence data, receive the first boot sequence change instruction, change the boot sequence data based on the first boot sequence change instruction to identify a virtual remote booting media as the bootable device, wherein the virtual remote booting media is configured to perform the remote booting process, receive the first reboot command, reboot the host computer based on the first reboot command, and perform the remote booting process, and generate a completion signal when the remote booting process is complete, and send the completion signal to the remote management computer via the network.

In certain embodiments, the remote management computer is configured to discover the host computer and the SP, select the BIOS image and the flasher utility based on information of the host computer, and generate the ISO image comprising the BIOS image and the flasher utility, generate the first notification, and send the first notification to the SP, receive the completion signal from the host computer via the network, and in response to the completion signal, generate a second notification indicating the remote booting process being complete, and send the second notification to the SP via the network.

In certain embodiments, the method further includes: receiving, at the SP, the second notification from the remote management computer, and in response to the second notification, generating, at the SP, a second boot sequence change instruction, and sending the second boot sequence change instruction to the host computer, such that the host computer changes the boot sequence data to identify the storage device as the bootable device. In certain embodiments, the executed BIOS is further configured to receive the second boot sequence change instruction, and change the boot sequence data based on the second boot sequence change instruction to identify the storage device as the bootable device.

In certain embodiments, the remote booting process is a preboot execution environment (PXE) booting process.

Certain aspects of the present disclosure direct to a non-transitory computer readable medium storing computer executable codes. The codes, when executed at a processor of a service processor (SP), are configured to receive a first notification from a remote management computer indicating that an ISO image exists at the remote management computer for a host computer to perform a remote booting process, wherein the host computer comprises a basic input/output system (BIOS) chip storing a current BIOS image and boot sequence data, wherein the host computer and the SP are respectively connected to the remote management computer via a network, and wherein the ISO image comprises a BIOS image and a flasher utility, in response to the first notification, generate a first boot sequence change instruction, and send the first boot sequence change instruction to the host computer, such that the host computer changes the boot sequence data stored in the BIOS chip based on the first boot sequence change instruction to perform the remote booting process with the ISO image from the remote management computer, and generate a first reboot command to reboot the host computer, and send the reboot command to the host computer, such that the host computer reboots based on the first reboot command and performs the remote booting with the ISO image to execute the flasher utility to of the ISO image to update the current BIOS image stored in the BIOS chip with the BIOS image of the ISO image.

In certain embodiments, the SP is a baseboard management controller (BMC).

In certain embodiments, the host computer further includes: a storage device storing an operating system (OS);

a memory; and a central processing unit (CPU), configured to load a copy of the current BIOS image from the BIOS chip to the memory and execute the current BIOS image as an executed BIOS. The executed BIOS, when executed at the CPU, is configured to boot from a bootable device identified by the boot sequence data, receive the first boot sequence change instruction, change the boot sequence data based on the first boot sequence change instruction to identify a virtual remote booting media as the bootable device, wherein the virtual remote booting media is configured to perform the remote booting process, receive the first reboot command, reboot the host computer based on the first reboot command, and perform the remote booting process, and generate a completion signal when the remote booting process is complete, and send the completion signal to the remote management computer via the network.

In certain embodiments, the remote management computer is configured to discover the host computer and the SP, select the BIOS image and the flasher utility based on information of the host computer, and generate the ISO image comprising the BIOS image and the flasher utility, generate the first notification, and send the first notification to the SP, receive the completion signal from the host computer via the network, and in response to the completion signal, generate a second notification indicating the remote booting process being complete, and send the second notification to the SP via the network.

In certain embodiments, the codes are further configured to receive the second notification from the remote management computer, and in response to the second notification, generate a second boot sequence change instruction, and send the second boot sequence change instruction to the host computer, such that the host computer changes the boot sequence data to identify the storage device as the bootable device. In certain embodiments, the executed BIOS is further configured to receive the second boot sequence change instruction, and change the boot sequence data based on the second boot sequence change instruction to identify the storage device as the bootable device.

In certain embodiments, the remote booting process is a preboot execution environment (PXE) booting process.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
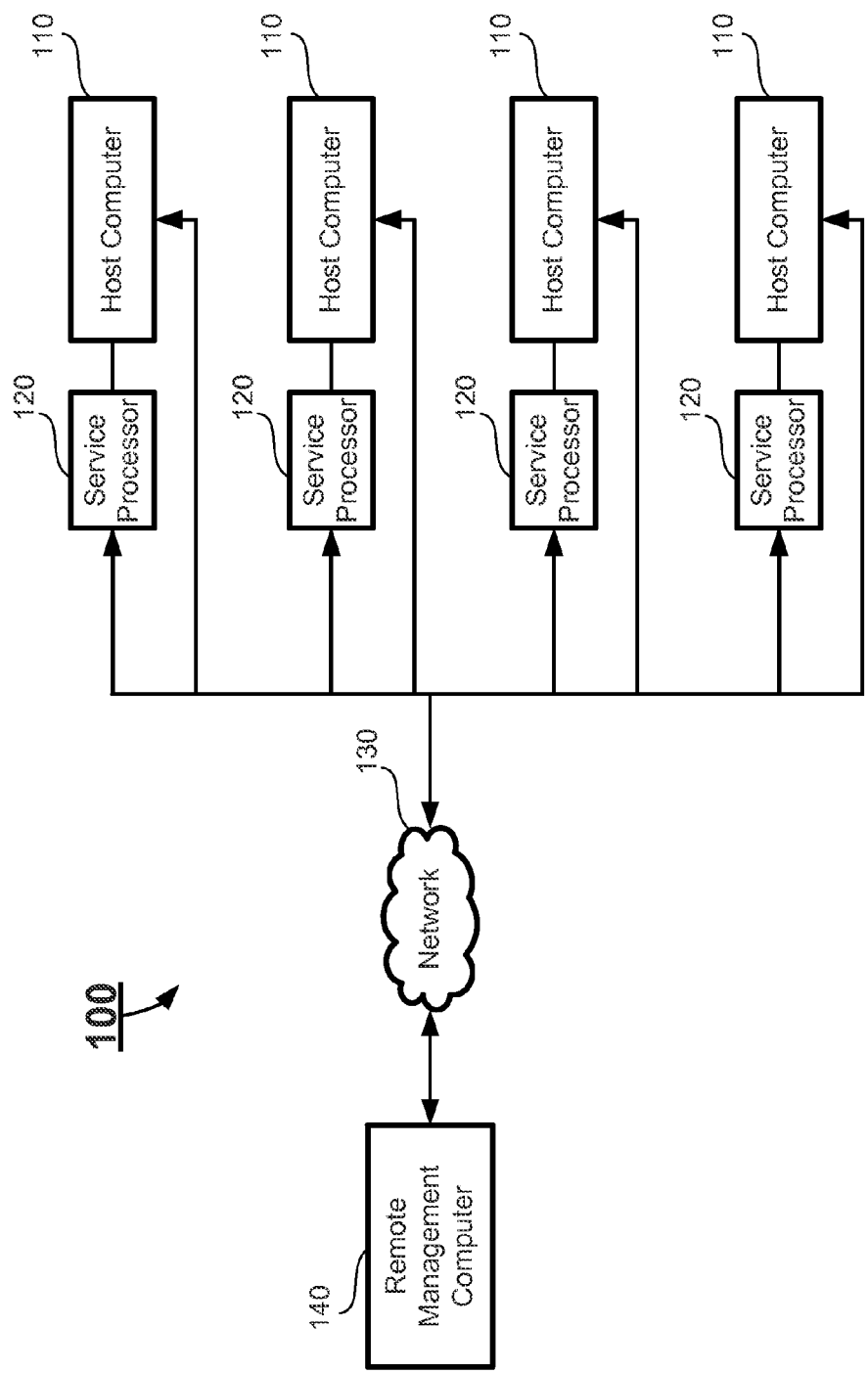
FIG. 1 schematically depicts a system having a plurality of host computers according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a system having a plurality of host computers 110 according to certain embodiments of the present disclosure. As shown in FIG. 1, the system 100 includes a plurality of host computers 110, and each host computer 110 has a service processor (SP) 120. Each host computer 110 and each SP 120 of each host computer 110 is respectively connected to a remote management computer 140 via a network 130. The system 100 can be a system that incorporates more than one interconnected system, such as a client-server network. The network 130 may be a wired or wireless network, and may be of various forms such as a local area network (LAN) or wide area network (WAN) including the Internet. In certain embodiments, the system 100 may include other physical or virtual components not shown in FIG. 1.

Figure 2:
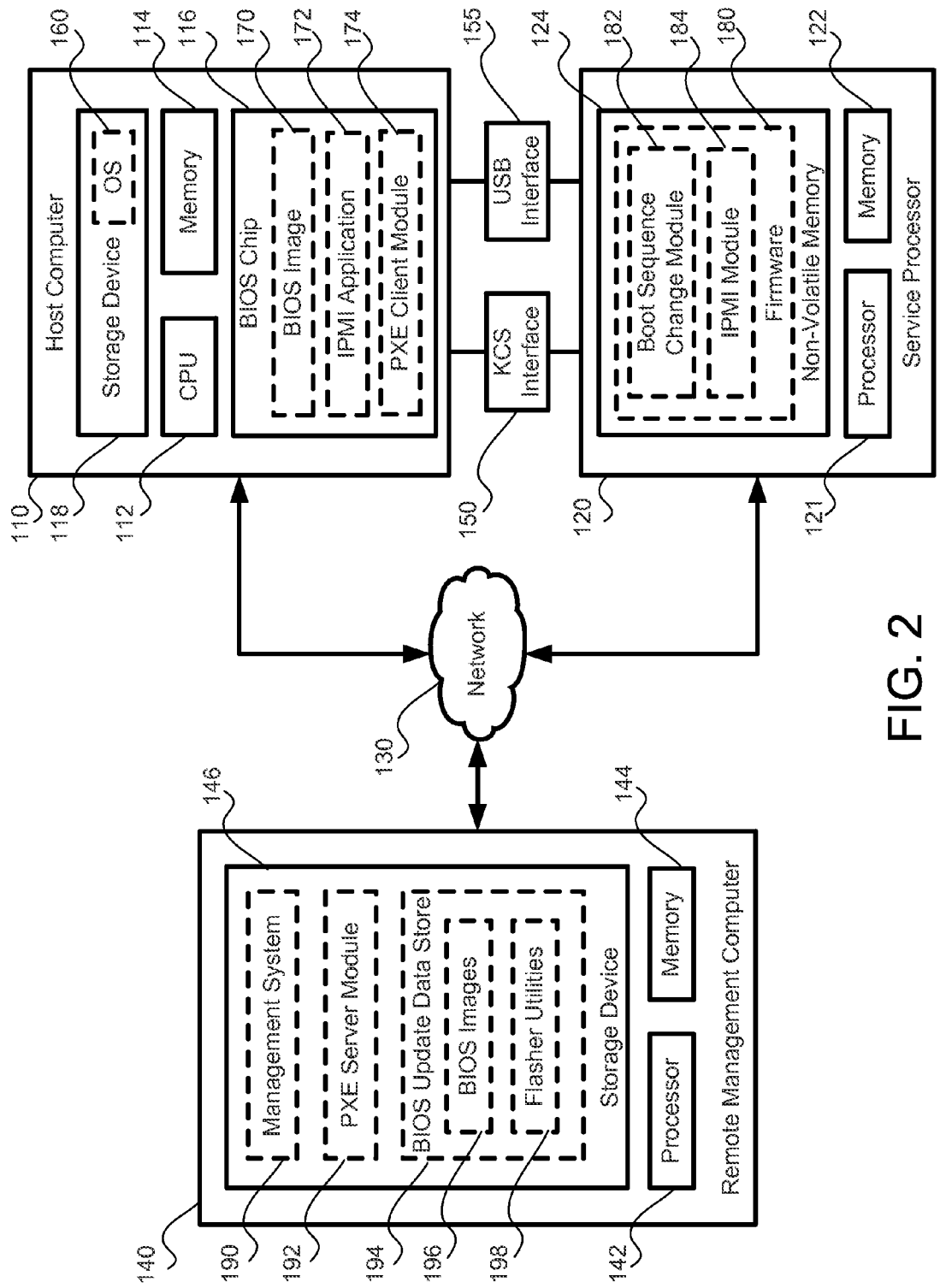
FIG. 2 schematically depicts a host computer, a service processor and a remote management computer of the system according to certain embodiments of the present disclosure.

FIG. 2 schematically depicts a host computer, a service processor and a remote management computer of the system according to certain embodiments of the present disclosure. As shown in FIG. 2, the SP 120 is connected to the host computer 110 via a keyboard controller style (KCS) interface 150 and a universal serial bus (USB) interface 155. In certain embodiments, the SP 120 may be connected to the host computer 110 via only one interface. For example, the SP 120 may be connected to the host computer 110 via the KCS interface 150 only, or via the USB interface 155 only.

In certain embodiments, the SP 120 may be connected to the host computer 110 via only one of the KCS interface 150 and the USB interface 155. For example, the SP 120 may be connected to the host computer 110 via only the KCS interface 150, or via only the USB interface 155.

In certain embodiments, the SP 120 may be connected to the host computer 110 via one or more interfaces replacing or in addition to the KCS interface 150 and the USB interface 155. For example, the SP 120 may be connected to the host computer 110 via other typical standardized Intelligent Platform Management Interface (IPMI) system interfaces, such as a system management interface chip (SMIC) interface or a block transfer (BT) interface. In certain embodiments, the SMIC interface and/or the BT interface can be used to replace one or both of the KCS interface 150 and the USB interface 155. In certain embodiments, data transfer between the host computer 110 and the SP 120 can be in the format of IPMI original equipment manufacturer (OEM) messages, and goes through one of the KCS interface 150 and the USB interface 155.

The remote management computer 140 is a management device of the system 100, which is subject to manage and control the operations of each of the host computers 110 and the SP's 120. In certain embodiments, the remote management computer 140 can be a computing device, which is operable independently from the host computers 110 and the SP's 120 to serve as a management server of the system 100. As shown in FIGS. 1 and 2, the remote management computer 140 is remotely connected to each of the host computers 110 and each of the SP's 120 via the network 130. One of ordinary skill in the art would appreciate that the system 100 may include one or more remote management computers 140. Examples of the remote management computer 140 may include, for example, desktop computers, laptop computers, workstations, portable devices such as smartphones, tablets or other mobile computer devices, or any other computing devices having management capabilities to the host computers 110 and the SP's 120.

Generally, the remote management computer 140 includes a baseboard or the "motherboard" (not shown). The baseboard is a printed circuit board to which a multitude of components or devices may be connected by way of a system bus or other electrical communication paths. Although not explicitly shown in FIG. 2, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the remote management computer 140 may include, but not limited to, a processor 142, a memory 144, and other required memory and Input/Output (I/O) modules (not shown). In certain embodiments, the processor 142 and the memory 144 may be embedded on the baseboard, or may be connected to the baseboard through at least one interface. In certain embodiments, the interface may be physical hardware interface such as electrical connectors, buses, ports, cables, terminals, or other I/O devices.

Further, the remote management computer 140 includes a storage device 146, which stores software applications and data, including a management system 190, a preboot execution environment (PXE) server module 192, and a BIOS update data store 194. In certain embodiments, the storage device 146 may store a web connection module (not shown) to establish a web connection to each of the host computers 110 and the SP's 120. In certain embodiments, the remote management computer 140 may include at least one I/O device (not shown) for generating and controlling input and output signals of the remote management computer 140. Examples of the I/O device include keyboards, touch pads, mouse, microphones, display screens, touch screens, or other I/O devices applicable for the remote management computer 140. Some I/O devices, such as touch screens, are provided for the dual input/output purposes.

The processor 142 controls operation of the remote management computer 140. The processor 142 can execute the management system 190, the PXE server module 192, the web connection module 194, or other applications of the remote management computer 140. In certain embodiments, the remote management computer 140 may run on or more than one processor.

The memory 144 can be a volatile memory, such as the random-access memory (RAM), for storing the data and information during the operation of the remote management computer 140. In certain embodiments, the memory 144 is in communication with the processor 142 through a system bus (not shown).

The storage device 146 is a non-volatile data storage media for storing the management system 190, the PXE server module 192, the BIOS update data store 194, and other applications and data of the remote management computer 140. Examples of the storage device 146 may include flash memory, memory cards, USB drives, hard drives, floppy disks, optical drives, or any other types of data storage devices.

The management system 190 is a collective management application for managing the operation of the system 100. For example, the management system 190 can include a set of functional programs that control and manage operations of the host computers 110, the SP's 120, and the remote management computer 140. The set of application programs provide certain utility software for managing the system 100. In certain embodiments, the management system 190 is operable to multitask, i.e., execute computing tasks for different host computers 110 and SP's 120 in multiple threads. In certain embodiments, the management system 190 is an extendible management server (XMS) software. In certain embodiments, the management system 190 can be compatible to the IPMI architecture for generating IPMI messages in order to communicate with the SP's 120.

In certain embodiments, the management system 190 provides a plurality of management functions to the host computers 110 and the SP's 120, such as discovering the host computers 110 and the SP's 120 in the system 100, and linking a discovered SP 120 to a corresponding host computer 120. In certain embodiments, the management system 190 may identify each of the host computers 110 and the SP's 120 using information such as an internet protocol (IP) address assigned to each host computer 110 and each SP 120. Thus, the management system 190 may discover the host computers 110 and the SP's 120 in the system 100 with the IP addresses. For example, the management system 190 may use the ping utility function to test the reachability of a host computer 110 or a SP 120. Ping utility is a computer network administration utility for reaching a target (i.e. a host computer 110 or a SP 120) with the IP address by sending Internet Control Message Protocol (ICMP) echo request packets to the target and waiting for an ICMP response. When the management system 190 discovers a plurality of host computers 110 and SP's 120, the management system 190 may make reference to an IP address map, which records the IP address of each of the host computers 110 and the SP's 120 in the system 100, to establish a link for a discovered SP 120 to a corresponding host computer 110. Once the management system 190 establishes the link between the SP 120 and the corresponding host computer 110, the management system 190 may control the SP 120 remotely to perform certain service processor functions, such as changing the boot sequence of the host computer 110, rebooting the host computer 110, and remotely updating the BIOS image 170 of the host computer 110. Details of these functions will be described later.

The PXE server module 192 is a program for communicating with the PXE client module 174 of the host computer 110. In certain embodiments, the PXE server module 192 may receive an instruction from the management system 190 to designate an ISO image, which is stored in the memory 144 of the remote management system 140, as a physical image of the PXE client module 174 of the host computer 110 to perform PXE booting. PXE booting refers to an environment to boot computers using a network interface independently of data storage devices or installed operating systems. PXE provides a way for network cards to initiate a network connection to servers before any OS is loaded so that the OS files can be downloaded over the network.

In certain embodiments, when a web connection is established between the remote management computer 140 and the host computer 110, PXE booting may be performed by the communication between the PXE server module 192 and the PXE client module 174. Specifically, the PXE server module 192 may receive a command from the PXE client module 174 of the host computer 110 through the web connection, and retrieve a copy of the ISO image based on the command, and send the retrieved copy of the ISO image back to the PXE client module 174 of the host computer 110 through the web connection. Details of the PXE booting process will be further explained later.

The BIOS update data store 194 is a data store for storing a variety of BIOS images 196 and corresponding flasher utilities 198 for flashing the corresponding BIOS images 196. Each BIOS image 196 has a corresponding flasher utility 198 for a specific make and model of a computer.

In certain embodiments, after the management system 190 discovers a host computer 110 and a corresponding SP 120, the management system 190 may control the SP 120 to remotely update the BIOS image 170 using media redirection. Specifically, the management system 190 may detect the specific make and model of the host computer 110, and select, from the BIOS images 196 and corresponding flasher utilities 198 stored in the BIOS update data store 194, a set of BIOS image 196 and flasher utility 198 for the host computer 110 based on the specific make and model of the host computer 110. Then the management system 190 creates an ISO image, which is autoexecutable, with the selected set of BIOS image 196 and flasher utility 198 for the host computer 110. The ISO image is an archive file which includes a file system and data of a storage device, such as an optical disc, and is autoexecutable as a bootable operating system to flash the BIOS image 190 of the host computer 110. Thus, the management system 190 may instruct the PXE server module 192 to designate the ISO image as the physical image for PXE booting, and send a notification to the SP 120 to instruct the boot sequence change module 182 of the SP 120 to change the boot sequence data stored in the BIOS image 170 of the host computer 110 for performing PXE booting. When the PXE booting process is complete, the management system 190 may a notification to the SP 120 to instruct the boot sequence change module 182 of the SP 120 to change the boot sequence data stored in the BIOS image 170 of the host computer 110 back to the original boot sequence data. Details of the PXE booting process will be further explained later.

Each of the host computers 110 may be a computing device, such as a general purpose computer or a headless computer. Although not explicitly shown in FIG. 2, the host computer 110 may include a baseboard or the "motherboard" (not shown). The components on the baseboard of the host computer 110 include, but not limited to, a central processing unit (CPU) 112, a memory 114, a BIOS chip 116, and other required memory and I/O modules (not shown). In certain embodiments, the SP 120 may also be a component on the baseboard of the host computer 110. In certain embodiments, the CPU 112, the memory 114, and the BIOS chip 116 may be embedded on the baseboard, or may be connected to the baseboard through at least one interface. In certain embodiments, the interface may be physical hardware interface such as electrical connectors, buses, ports, cables, terminals, or other I/O devices.

Further, the host computer 110 includes a storage device 118, which stores a plurality of software applications, including an operating system (OS) 160. In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

The CPU 112 is a host processor which is configured to control operation of the host computer 110. The host processor can execute the OS 160, the BIOS 170, or other applications of the host computer 110. In certain embodiments, the host computer 110 may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the host computer 110. In certain embodiments, the memory 114 is in communication with the CPU 112 through a system bus (not shown).

The BIOS chip 116 is one of the most crucial components in the host computer 110 or any computer system. In certain embodiments, the BIOS chip 116 is a non-volatile memory, such as a flash memory chip, an electrically erasable programmable read-only memory (EEPROM) chip or a complementary metal oxide semiconductor (CMOS) memory. As shown in FIG. 2, the BIOS chip 116 stores a BIOS image 170 (hereinafter the BIOS 170), an IPMI application 172 and a PXE client module 174.

The BIOS 170 is an image file storing the firmware codes which, when executed at the CPU 112, are configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the OS 160 in the protected mode. In certain embodiments, the BIOS 170 includes certain information of the host computer 110, such as the make and model of the host computer 110.

As described above, the BIOS 170 can perform the startup or the booting functions. In the booting process, the BIOS 170 performs a power-on self-test operation, which initializes and identifies the system hardware devices of the host computer 110, such as the CPU 112, the memory 114, the storage device 118, peripheral I/O devices such as display card, keyboard and mouse, and other hardware devices. In certain embodiments, the BIOS 170 may identify the storage device 118, which stores an operating system (OS) 160, as a bootable device. Specifically, the BIOS 170 may include boot sequence data, which stores information of the storage device 118 as the bootable device. Once the BIOS 170 completes the self-test operation, the BIOS 170 then attempts to boot the host computer 110, i.e., instructs the CPU 112 to read and execute the OS 160 from the bootable device, i.e. the storage device 118 as specified in the BIOS 170. Typically, the BIOS 170 attempts to load a boot loader program from the storage device 118. The boot loader program then loads the OS 160 from the storage device 118. Thus, the CPU 112 can execute the OS 160 and run an instance of the OS 160. At the end of the booting process, the control of the computer system is given to the OS 160.

In certain embodiments, the SP 120 may change the boot sequence data of the BIOS 170 during the booting process such that the BIOS 170 may identify another device as the bootable device. For example, during a BIOS updating process, the firmware 180 of the SP 120 may change the boot sequence data to identify a PXE remote storage drive as the bootable device. In this case, when the BIOS 170 attempts to boot the host computer 110 according to the boot sequence data, the BIOS 170 may instruct the CPU 112 to perform PXE booting from the PXE remote storage drive, and to read and execute a BIOS flasher utility program from the PXE remote storage drive to update the BIOS image 170 stored in the BIOS chip. Once the BIOS updating process is complete, the firmware 180 of the SP 120 may change the boot sequence data back to identify the storage device 118 as the bootable device. In certain embodiments, the PXE remote storage drive can be implemented by the PXE client module 174. The operation of the PXE client module 174 will be explained later.

The IPMI application 172 is a computer program that generates and processes IPMI messages. In certain embodiments, when the BIOS 170 is executed at the CPU 112 in the booting process, the BIOS 170 may send data to the IPMI application 172 for converting the data between IPMI messages and data recognizable by the BIOS 170. For example, during the booting process, the BIOS 170 may generate a notification to be sent to the SP 120 indicating the condition of the booting process, i.e. successful booting or error occurring. In order to send the notification to the SP 120, the BIOS 170 can send data of the notification to the IPMI application 172. Upon receiving the data of the notification, the IPMI application 172 converts the data to an IPMI OEM message representing the notification, and sends the IPMI OEM message back to the BIOS 170. When the BIOS 170 receive the IPMI OEM messages from the SP 120 or any other peripheral devices, the BIOS 170 can send the received IPMI OEM messages to the IPMI application 172. The IPMI application 172 processes the IPMI OEM messages to generate data recognizable by the BIOS 170, and then sends the data back to the BIOS 170 for further process.

In certain embodiments, the IPMI application 172 is separated from the BIOS 170 as an independent program. In certain embodiments, the IPMI application 172 can be a part of the BIOS 170, which is compatible to the IPMI architecture for generating IPMI messages.

The IPMI messages can be transmitted, translated, bussed, and wrapped in a variety of fashions. Generally, an IPMI message can be a request message (generally labeled as "rq") or a response message (generally labeled as "rs"), and has a plurality of fields, including the network function (NetFn) field, the logical unit number (LUN) field, the sequence number (Seq#) field, the command (CMD) field, and the data field.

The NetFn field is a six-bit field that describes the network function of the IPMI message. The IPMI Specification defines certain predefined categories for the NetFn field, and there are reserved codes for OEM expansion. For a request message, the NetFn field is an odd number, and for a response message, the NetFn field is an even number.

The LUN field is a two-digit logical unit number for sub-addressing purposes. For low-end integrity servers and computers, the LUN field is always zero.

The Seq# field defines a sequence number in the response message to identify the response message in response to a certain request message. In certain embodiments, the value stored in the Seq# field is the same number as the sequence number appeared in the CMD field of the request message to which the response message is in response. As discussed above, the Seq# field must be provided when the NetFn field is an even number to indicate the IPMI message as a response message.

The CMD field includes the commands of the IPMI message. When the IPMI message is a request message, the CMD field includes a sequence number such that a response message to the request message may include the same sequence number in the Seq# field.

The data field includes all data transferred by the IPMI message. In certain embodiments, the data field of an IPMI message can be 0 bytes. In other words, an IPMI message may contain no data field.

Figure 3:
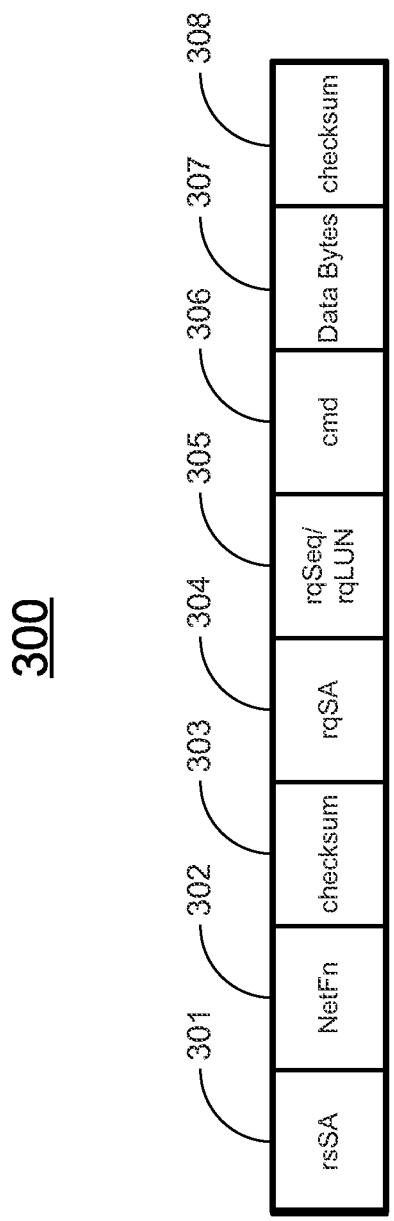
FIG. 3 schematically depicts an IPMI message according to certain embodiments of the present disclosure.

FIG. 3 schematically depicts an IPMI message according to certain embodiments of the present disclosure. As shown in FIG. 2B, each block of the IPMI message 300 refers to a field, which may have a different length. The IPMI message 300 includes a plurality of fields, such as the rs slave address (rsSA) field 301, the NetFn field 302, the rq slave address (rqSA) field 304, the rq Seq# (rqSeq)/rqLUN field 305, the command field 306, and the data field 307. Further, a plurality of checksum fields 303 and 308 are included for checksum verification purposes. As discussed above, the data field 307 may contain 0 bytes of data (i.e. no data field) or more than one byte of data.

In certain embodiments, IPMI OEM messages are used for data transaction purposes between the BIOS 170 and the SP 120. When the IPMI application 172 processes data to be transferred to the SP 120 to generate an IPMI OEM message, the data can be stored in the data field 307 of the IPMI OEM message as shown in FIG. 3.

The PXE client module 174 is a client module that communicates with the PXE server module 192 of the remote management computer 140 to perform PXE booting. Specifically, the communication between the PXE server module 192 and the PXE client module 174 essentially implements a virtual PXE remote storage media, which may be a bootable device for the host computer 110. In other words, the host computer 110 performs PXE booting from the virtual PXE remote storage media through the communication between the PXE client module 174 and the PXE server module 192.

In certain embodiments, the PXE client module 174 communicates with the PXE server module 192 of the remote management computer 140, which designates an ISO image as the physical image for PXE booting. In certain embodiments, when the PXE client module 174 receives an instruction from the host computer 110 to perform PXE booting, the PXE client module 174 generates a command to access the ISO image (i.e. the physical image) based on the instruction, and sends the command to the PXE server module 192 of the remote management computer 140 to retrieve and sends a copy the ISO image back to the host computer 110 based on the command. Once the PXE server module 192 sends the copy of the ISO image back to the PXE client module 174, the PXE client module 174 may store the copy of the ISO image in the memory 114, and executes the program in the ISO image.

As discussed above, the communication between the PXE server module 192 and the PXE client module 174 essentially implements a virtual PXE remote storage media. By changing the boot sequence data of the BIOS 170, the virtual PXE remote storage media may be designated as a bootable device for the host computer 110. For example, when the boot sequence data of the BIOS 170 identifies the virtual PXE remote storage media as the bootable device, the BIOS 170 executed at the CPU 112 of the host computer 110 attempts to boot from the virtual PXE remote storage media. Specifically, the BIOS 170 issues an instruction to the PXE client module 174 to load a program from the virtual PXE remote storage media through the USB interface 155. Upon receiving the instruction from the host computer 110, the PXE client module 174 performs PXE booting based on the instruction to communicate with the PXE server module 192 of the remote management computer 140, and to receive the copy of the ISO image from the PXE server module 192. Once the PXE client module 174 receives and stores the copy of the ISO image in the memory 114, the PXE client module 174 may then access the program from the ISO image, and loads the program file from the ISO image for execution.

Various implementations may apply to the PXE client module 174 to perform PXE booting. In certain embodiments, PXE booting functions together with a dynamic host configuration protocol (DHCP) service. DHCP is a network protocol used to configure network devices so that the devices may communicate to one another on an IP network. Specifically, a DHCP service receives requests for IP addresses from other devices on the network, and issues IP addresses in response to such requests such that other server and client machines on the network may identify the device with the IP address.

An example of the PXE/DHCP protocol operates as follows. The PXE client initiates the PXE protocol by broadcasting a DHCPDISCOVER packet, which contains an extension that identifies the request as coming from the client that implements the PXE protocol. Assuming that a DHCP server or a proxy DHCP server implementing this extended protocol is available, after several intermediate steps, the PXE server sends the PXE client a list of appropriate boot servers. The PXE client then discovers a boot server of the type selected, and receives the name of an executable file on the chosen boot server. The PXE client then uses TFTP to download the executable from the boot server. Finally, the client initiates execution of the downloaded image for booting. At this point, the client's state must meet certain requirements that provide a predictable execution environment for the image. Important aspects of this environment include the availability of certain areas of the client's main memory, and the availability of basic network I/O services.

Figure 4:
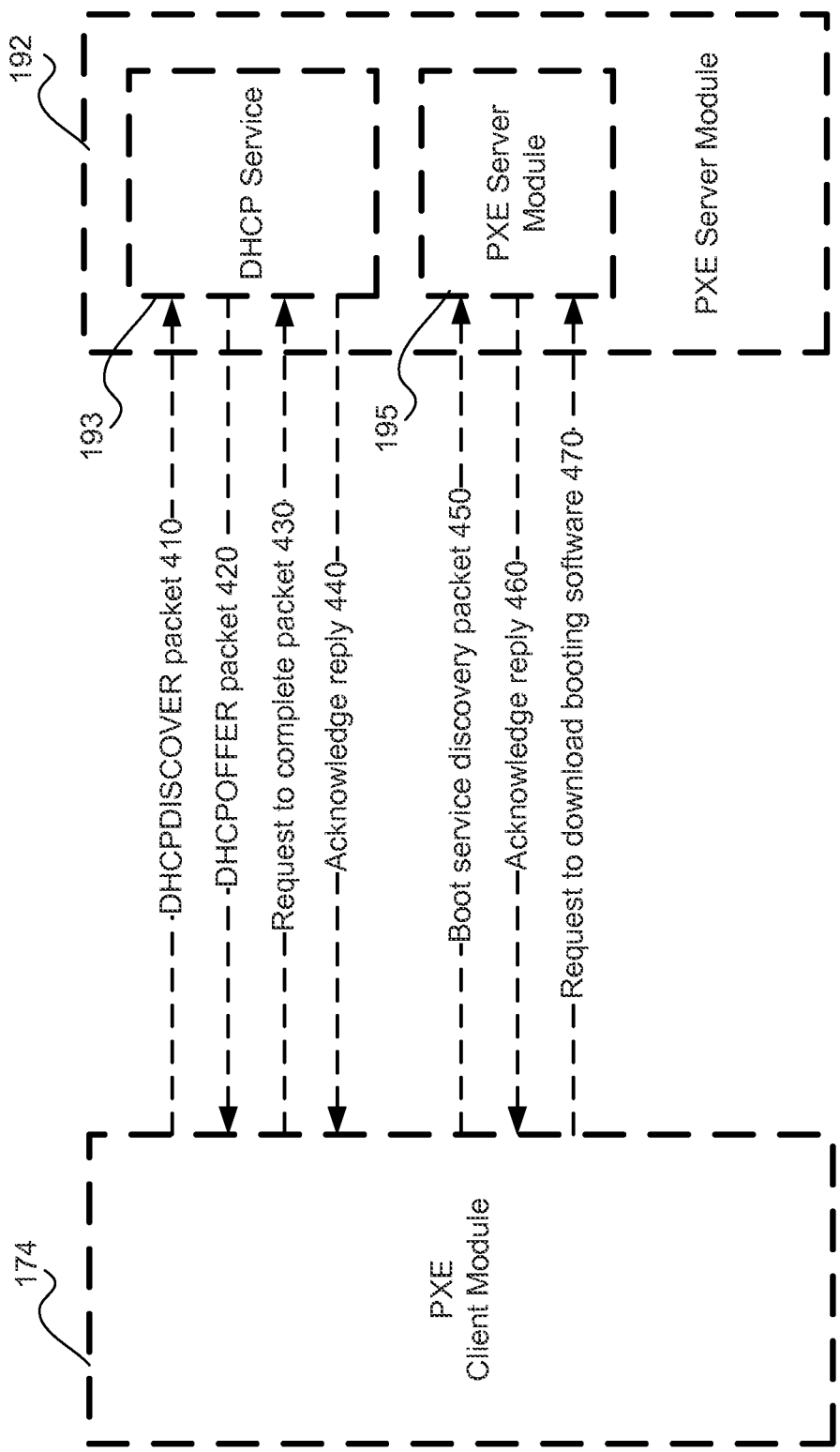
FIG. 4 schematically depicts a preboot execution environment (PXE) booting process between the host computer and the remote management computer of the system according to certain embodiments of the present disclosure.

FIG. 4 schematically depicts a PXE booting process between the host computer and the remote management computer of the system according to certain embodiments of the present disclosure. To perform PXE booting with DHCP service, the host computer 110 serves as a PXE/DHCP client, and the remote management computer 140 serves as a PXE/DHCP server. In other words, the PXE client module 174 of the host computer 110 functions as a PXE/DHCP client module, and the PXE server module 192 of the remote management computer 140 functions as a PXE/DHCP server module, which includes a DHCP service 193 and a PXE service 195.

As shown in FIG. 4, the PXE booting process between the host computer 110 and the remote management computer 140 operates as follows. When the PXE client module 174 (i.e. the PXE/DHCP client module) of the host computer 110 receives the instruction from the host computer 110 to perform PXE booting, the PXE client module 174 attempts to locate the PXE server module 192 (i.e. the PXE/DHCP server module) via the network 130 (not shown in FIG. 3). Specifically, the PXE client module 174 broadcasts, via the network 130, an extended DHCPDISCOVER packet 410 to port 67/UDP, which is the standard DHCP port. The extended DHCPDISCOVER packet 410 includes regular DHCPDISCOVER packet information, which is extended with additional information of PXE options, such as PXE client extension tags, for showing the identity of the PXE client module 174 of the host computer 110. The PXE options and extension tags identify the PXE client module 174 of the host computer 110 being broadcasting the DHCPDISCOVER packet 410 as capable of performing PXE remote booting. Standard DHCP servers without PXE service would ignore such PXE options in the extended DHCPDISCOVER packet 410. On the other hand, the DHCP service 193 of the PXE server module 192, which operates with the PXE service 195, would detect the PXE options in the extended DHCPDISCOVER packet 410.

When the DHCP service 193 of the PXE server module 192 detects the PXE options in the extended DHCPDISCOVER packet 410 broadcasted by the PXE client module 174, the DHCP service 193 responds to the PXE client module 174 with an extended DHCPOFFER packet 420 to port 68, which is the standard DHCP port. The extended DHCPOFFER packet 420 includes PXE/DHCP configurations available for a PXE web connection under the TFTP protocol. The PXE/DHCP configurations include PXE server extension tags and other DHCP option tags to the PXE client module 174, a boot server list, and other necessary discovery control options. In this embodiment, the boot server list includes information of the PXE service 195 such that the PXE client module 174 may establish PXE booting connection with the PXE service 195 of the PXE server module 192.

When the PXE client module 174 receives the extended DHCPOFFER packet 420 from the PXE server module 192, the PXE client module 174 performs necessary configurations corresponding to one of the PXE configurations in the DHCPOFFER packet 420, such as selecting the PXE service 195 of the PXE server module 192 as the PXE server. The PXE client module 174 then sends a request to complete packet 430 to port 67 back to the DHCP service 193 of the PXE server module 192. Upon receiving the request to complete packet 430, the DHCP service 193 returns with an acknowledge reply 440 to port 68 back to the PXE client module 174.

Then, the PXE client module 174 sends a boot service discover packet 450 to port 67 or port 4011 of the PXE service 195 of the PXE server module 192, which is the standard PXE boot multicast or unicast port. The use of port 67 or port 4011 is determined by the discovery control options included in the DHCPOFFER packet 420. The boot service discover packet 450 includes information of the PXE/DHCP options of the PXE client module 174, such as the PXE client extension tags and the DHCP option tags corresponding to the PXE service 195. Upon receiving the boot service discover packet 450, the PXE service 195 returns with an acknowledge reply 460 to the client source port. The acknowledge reply 460 includes information of the PXE/DHCP options of the PXE service 195, such as the PXE server extension tags, and information of the ISO image, which is designated as the bootable operating system for the PXE booting process. The information of the ISO image may include a list of filenames of files (e.g., the BIOS image 196 and the flasher utility 198) stored in the ISO image and other related information of the files.

When the PXE client module 174 receives the acknowledge reply 460, the PXE client module 174 sends a command, or a request 470, to download the ISO image to port 69, which is the TFTP port. The request 470 includes the information of the files to be downloaded. Thus, the PXE service 195 may respond to the request 470 by sending a copy of the ISO image to the PXE client module 174, and the PXE client module 174 may store the copy of the ISO image in the memory 114 of the host computer 110 such that the host computer 110 may boot from the ISO image. Once the host computer 110 boots from the ISO image, the host computer 110 may execute the flasher utility 198 stored in the ISO image, which is configured to replace the BIOS image 170 in the BIOS chip 116 with the BIOS image 196 stored in the ISO image.

The storage device 118 is a non-volatile data storage media for storing the OS 160 and other applications of the host computer 110. Examples of the storage device 118 may include flash memory, memory cards, USB drives, hard drives, floppy disks, optical drives, or any other types of data storage devices.

The OS 160 can be collective management software managing the operation of the host computer 110. For example, the OS 160 can include a set of functional programs that control and manage operations of the devices connected to the host computer 110. The set of application programs provide certain utility software for the user to manage the host computer 110. In certain embodiments, the OS 160 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, the OS 160 can also be compatible to the IPMI architecture for generating IPMI messages in order to communicate with the SP 120.

The SP 120 is a specialized microcontroller that manages the interface between system management software and platform hardware. In certain embodiments, the SP 120 may be a baseboard management controller (BMC). Different types of sensors can be built into the host computer 110, and the SP 120 reads these sensors to obtain parameters such as temperature, cooling fan speeds, power status, OS status, etc.

The SP 120 monitors the sensors and can send out-of-band (OOB) alerts to a system administrator of the host computer 110 if any of the parameters do not stay within preset limits, indicating a potential failure of the host computer 110. In certain embodiments, the administrator can also remotely communicate with the SP 120 from a remote management computer via a network to take remote action to the host computer. For example, the administrator may reset the host computer 110 from the remote management computer through the SP 120, and may obtain system information of the host computer 110 OOB without interrupting the operation of the host computer 110.

As shown in FIG. 2, the SP 120 includes a processor 121, a memory 122 and a non-volatile memory 124. In certain embodiments, the SP 120 may include other components, such as at least one I/O device (not shown).

The processor 121 controls operation of the SP 120. The processor 121 can execute the firmware or other codes stored in the non-volatile memory 124 of the SP 120. In certain embodiments, the SP 120 may run on or more than one processor.

The memory 122 can be a volatile memory, such as the RAM, for storing the data and information during the operation of the SP 120. When the SP 120 restarts, the contents stored in the memory 122 will be lost.

The non-volatile memory 124 stores the firmware 180 of the SP 120. The firmware 180 of the SP 120 includes computer executable codes for performing the operation of the SP 120. As shown in FIG. 2, the firmware 180 of the SP 120 includes, among other things, a boot sequence change module 182, an IPMI module 184, and a web connection module 184. In certain embodiments, the firmware 180 may include a web connection module (not shown) for communication with the network such that the administrator of the computer system may connect to the SP 120 remotely from a remote management computer via the network.

The boot sequence change module 182 is a module for changing the boot sequence data stored in the BIOS image 170 of the host computer 110. Specifically, when the firmware 180 of the SP 120 instructs the boot sequence change module 182 to change the boot sequence data of the BIOS 170 of the host computer 110, the boot sequence change module 182 generates a corresponding instruction, and sends the instruction to the IPMI module 184 such that the IPMI module 184 may process the instruction to generate a corresponding IPMI OEM message, which may be then sent to the host computer 110. In certain embodiments, the boot sequence change module 182 may be a part of the firmware 180, or may be a separate application program independent from the firmware 180.

In certain embodiments, when the management system 190 sends a notification to the SP 120 for the purpose of changing the boot sequence data for PXE booting, the firmware 180 of the SP 120 receives the notification, and instructs the boot sequence change module 182 to generate an instruction to change the boot sequence data of the BIOS 170 to identify PXE booting (i.e. the virtual PXE remote storage media) as the bootable device.

In certain embodiments, when the management system 190 sends a notification to the SP 120 for the purpose of changing the boot sequence data back to the original boot sequence data, the firmware 180 of the SP 120 receives the notification, and instructs the boot sequence change module 182 to generate an instruction to change the boot sequence data of the BIOS 170 to identify the storage device 118, or any other bootable device as indicated in the original boot sequence data, as the bootable device.

The IPMI module 184 is a program of the SP 120 to generate and process IPMI messages for the SP 120. In certain embodiments, when the firmware 180 or the boot sequence change module 182 generates data to be sent to the host computer 110 under the IPMI architecture, the firmware 180 or the boot sequence change module 182 sends the data to the IPMI module 184. Upon receiving the data, the IPMI module 184 converts the data to corresponding IPMI OEM messages, and sends the IPMI OEM messages back to the firmware 180 of the SP 120 such that the firmware 180 may send the IPMI OEM messages to the host computer 110. When the SP 120 receives IPMI OEM messages from the host computer 110 or any other IPMI compatible devices, the firmware 180 of the SP 120 sends the received IPMI OEM messages to the IPMI module 184. The IPMI module 184 processes the IPMI OEM messages to generate data recognizable by the firmware 180, and then sends the data to the firmware 180 for further process. In certain embodiments, the IPMI module 184 can be a similar program to the IPMI application 172 at the host computer 110.

Currently, almost all firmware of SP's or BMC's available in the market supports the IPMI architecture, and provide a variety of IPMI modules 184. In certain embodiments, the IPMI module 184 can be a part of the firmware of the SP 120, which is compatible to the IPMI architecture for generating IPMI messages. In certain embodiments, the IPMI module 184 is separated from the firmware of the SP 120 as an independent program.

In certain embodiments, IPMI OEM messages are used for data transaction purposes between the BIOS 170 and the SP 120. When the IPMI module 184 processes data to be transferred to the host computer 110 to generate an IPMI OEM message, the data can be stored in the data field 307 of the IPMI OEM message as shown in FIG. 3.

The KCS interface 150 is a standardized interface often used between a SP and a payload processor in the IPMI architecture. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, in addition to the standard predefined commands and parameters, IPMI allows OEM extensions for the manufacturers and users to define OEM specific commands. A user may use IPMI OEM messages to control data transmission via the KCS interface 150. The IPMI OEM messages may be used for the data transaction between the host computer 110 and the SP 120. In certain embodiments, the IPMI OEM messages may include the specific data to be transferred, or the request for the specific data.

The USB interface 155 is an industry standardized interface under the USB industry standard that defines the cables, connectors and communications protocols used in a bus for connection, communication, and power supply between computers and electronic devices. In certain embodiments, the USB interface 155 is a USB port.

USB has effectively replaced a variety of earlier interfaces, such as serial and parallel ports, as well as separate power chargers for portable devices. Currently, USB allows bi-directional communications between the host computer 110 and the SP 120, as USB 3.0 allows for device-initiated communications towards the host.

In certain embodiments, the USB interface 155 may be used to transfer IPMI OEM messages between the host computer 110 and the SP 120. In certain embodiments, when the SP 120 is connected to the host computer 110 via the USB interface 155, the OS 160 may request and receive a plurality of USB descriptors from the SP 120 through the USB interface 130. Based on information of the USB descriptors, the OS 160 may recognize the BMC 120 as the specific USB human interface device (HID) device, and recognize a predefined format of a USB HID report for transferring data to the specific HID device (i.e. the BMC 120). In certain embodiments, the USB HID report is in the predefined format based on the information of the USB descriptors with the IPMI OEM messages embedded therein. Thus, the IPMI OEM messages can be transferred between the host computer 110 and the SP 120 through the USB interface 155 by transferring the USB HID reports with the IPMI OEM messages embedded therein.

Figure 5A:
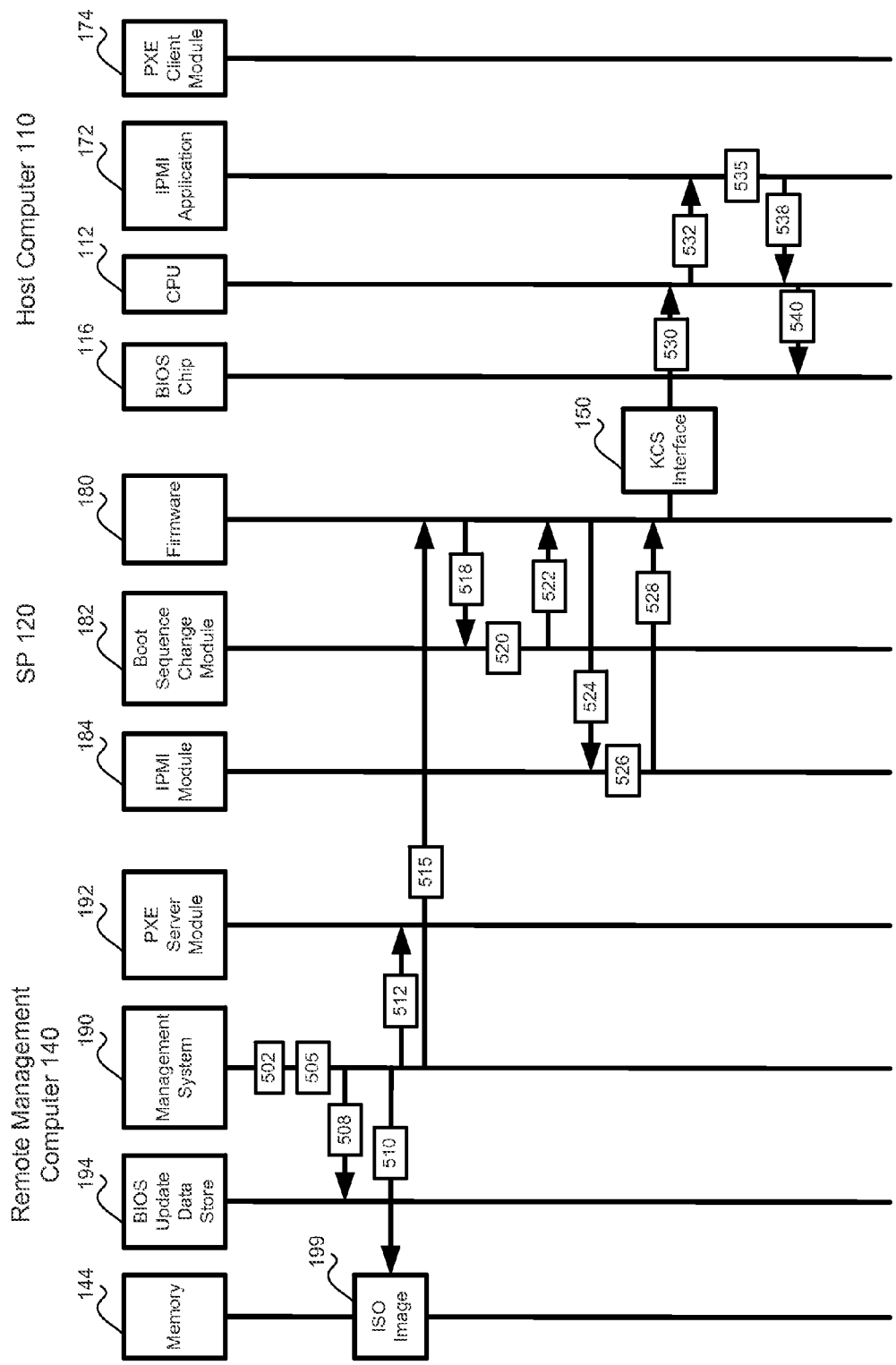
FIGS. 5A-5C schematically depict a process of remotely updating the BIOS image of a host computer with a service processor according to certain embodiments of the present disclosure.
Figure 5B:
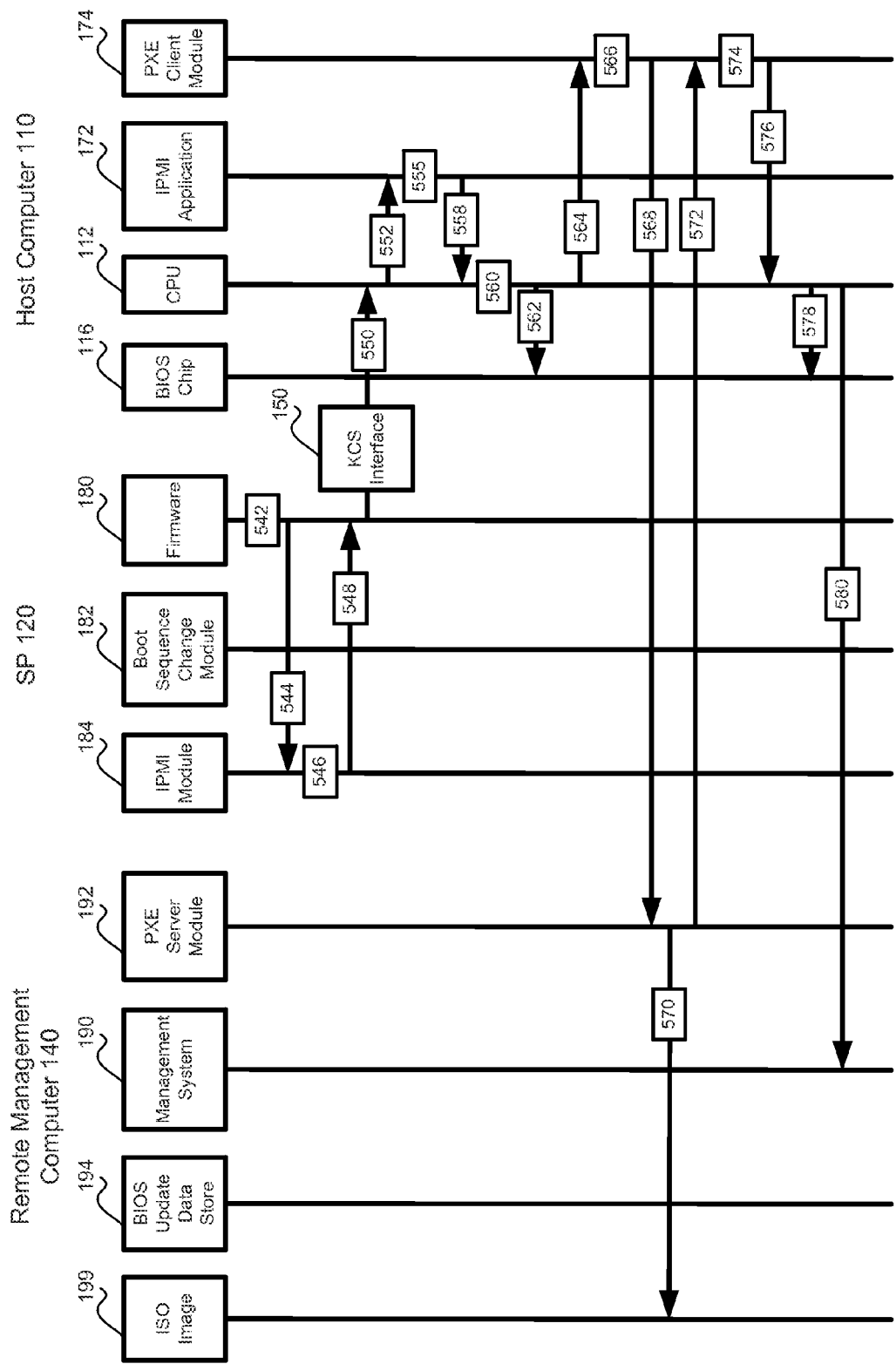
Figure 5C:
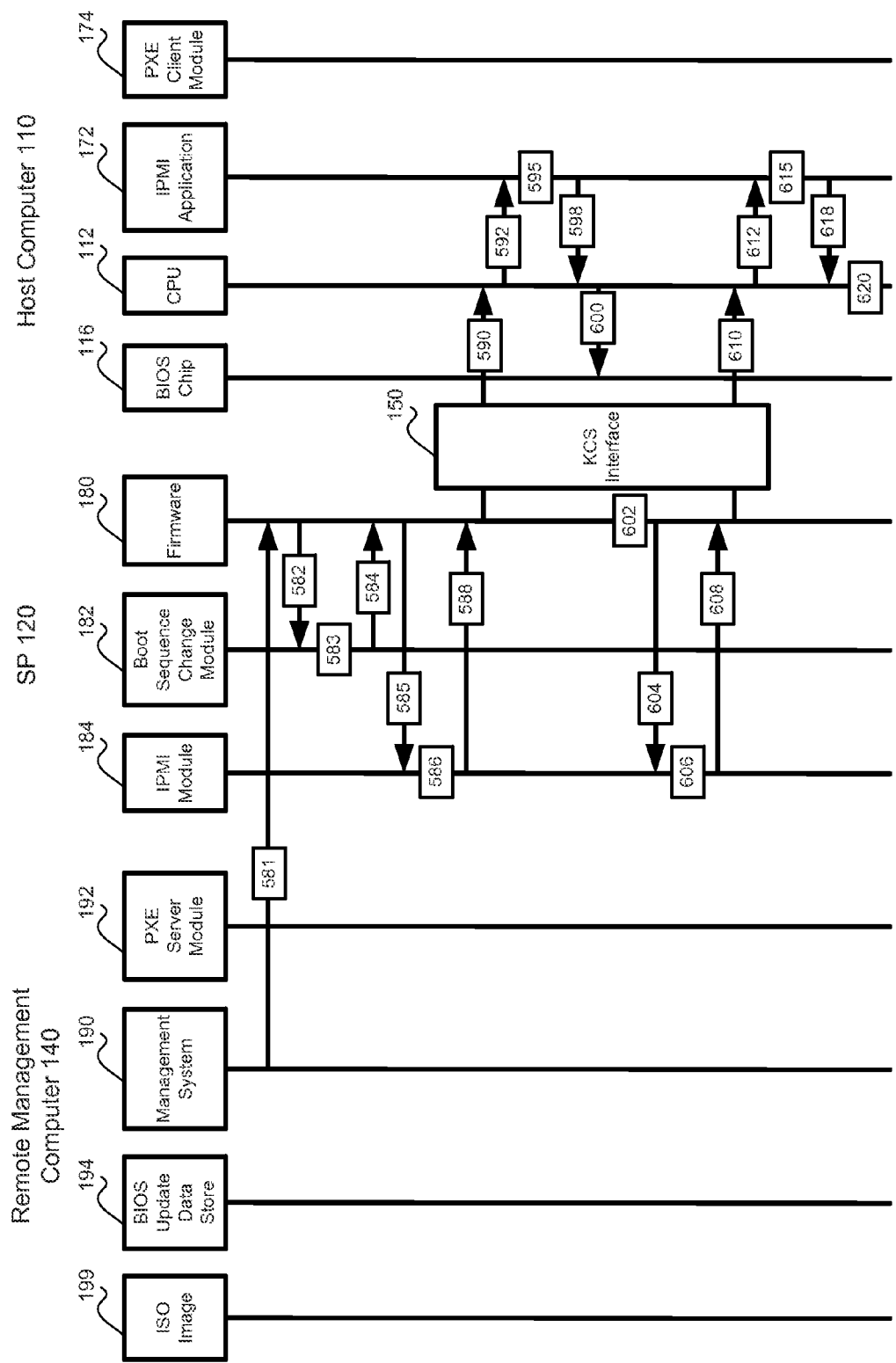

FIGS. 5A-5C schematically depict a process of remotely updating the BIOS image of a host computer with a service processor according to certain embodiments of the present disclosure. In this embodiment, the storage device 118 of the host computer 110 stores a bootable OS 160. Before the BIOS updating process starts, the boot sequence data stored in the BIOS 170 of the BIOS chip 116 identifies the storage device 118 as a bootable device. In other words, when the host computer 110 restarts in a normal booting process, the BIOS 170 may boot from the OS 160 stored in the storage device 118.

Referring to FIG. 5A, at procedure 502, the management system 190 of the remote management computer 140 discovers the host computers 110 and the SP's 120 in the system 100. At procedure 505, the management system 190 selects or determines one of the host computers 110, which has a corresponding SP 120, to perform BIOS update, and collects the information of the host computer 110, such as the make and model of the host computer 110.

At procedure 508, the management system 190 retrieves, from the BIOS update data store 194, a BIOS image 196 and a flasher utility 198 based on the information of the host computer 110. At procedure 510, the management system 190 creates an ISO image 199 having the retrieved BIOS image 196 and the flasher utility 198, and stores the ISO image 199 in the memory 144 of the remote management computer 140. In certain embodiments, the ISO image 199 is an autoexecutable image which, when executed at a processor, automatically executes the flasher utility 198 stored therein.

At procedure 512, the management system 190 instructs the PXE server module 192 to designate the ISO image 199 as the physical image for PXE booting. At procedure 515, the management system 190 sends, through the network 130 (not shown), a notification to the firmware 180 of the SP 120 that the ISO image 199 is ready for the PXE booting process. Upon receiving the notification from the management system 190, at procedure 518, the firmware 180 instructs the boot sequence change module 182 to change the boot sequence data of the BIOS 170 of the host computer 110. At procedure 520, the boot sequence change module 182 generates an instruction to change the boot sequence data of the BIOS 170 for PXE booting. The instruction indicates the information of the PXE booting process. At procedure 522, the boot sequence change module 182 sends the instruction back to the firmware 180.

At procedure 524, the firmware 180 sends the instruction to the IPMI module 184 for processing. Upon receiving the instruction, at procedure 526, the IPMI module 184 converts the instruction to generate the IPMI OEM message. At procedure 528, the IPMI module 184 sends the IPMI OEM message back to the firmware 180.

At procedure 530, the firmware 180 sends the IPMI OEM message representing the instruction to change the boot sequence data to the host computer 110 through the KCS interface 150. It should be appreciated that the IPMI OEM message can be sent to the host computer 110 through other interfaces, such as the USB interface 155 or any other system interfaces.

When the CPU 112 of the host computer 110 receives the IPMI OEM message representing the instruction, at procedure 532, the CPU 112 sends the IPMI OEM message to the IPMI application 172 for processing. Upon receiving the IPMI OEM message, at procedure 535, the IPMI application 172 converts the IPMI OEM message to generate the instruction to change boot sequence data, which is recognizable by the CPU 112. At procedure 538, the IPMI application 172 sends the instruction back to the CPU 112. Upon receiving the instruction, at procedure 540, the CPU 112 changes the boot sequence data of the BIOS 170, which is stored in the BIOS chip 116 of the host computer 110, to identify PXE booting as the bootable device. Thus, during the next booting process of the host computer 110, the BIOS 170 may boot through PXE booting instead of booting from the OS 160 stored in the storage device 118.

Once the boot sequence data is changed, the firmware 180 of the SP 120 may send a command to reboot the host computer 110. Referring to FIG. 5B, at procedure 542, the firmware 180 generates the reboot command. At procedure 544, the firmware 180 sends the reboot command to the IPMI module 184 for processing. Upon receiving the reboot command, at procedure 546, the IPMI module 184 converts the reboot command to generate the IPMI OEM message. At procedure 548, the IPMI module 184 sends the IPMI OEM message back to the firmware 180.

At procedure 550, the firmware 180 sends the IPMI OEM message representing the reboot command to the host computer 110 through the KCS interface 150. It should be appreciated that the IPMI OEM message can be sent to the host computer 110 through other interfaces, such as the USB interface 155 or any other system interfaces.

When the CPU 112 of the host computer 110 receives the IPMI OEM message representing the reboot command, at procedure 552, the CPU 112 sends the IPMI OEM message to the IPMI application 172 for processing. Upon receiving the IPMI OEM message, at procedure 555, the IPMI application 172 converts the IPMI OEM message to generate the reboot command, which is recognizable by the CPU 112. At procedure 558, the IPMI application 172 sends the reboot command back to the CPU 112. Upon receiving the reboot command, at procedure 560, the CPU 112 restarts the host computer 110.

When the host computer 110 restarts, at procedure 562, the CPU 112 loads and executes the BIOS 170 from the BIOS chip 116. Since the boot sequence data of the BIOS 170 now identifies PXE booting as the bootable device, at procedure 564, the executed BIOS 170 sends an instruction to the PXE client module 174 of the SP 120 to perform PXE booting.

Upon receiving the instruction from the executed BIOS 170, at procedure 566, the PXE client module 174 initiates PXE booting, and generates a command to retrieve the physical image (i.e. the ISO image 199) of the PXE booting process based on the instruction to load the bootable system. At procedure 568, the PXE client module 174 communicates to the PXE server module 192 of the remote management computer 140 through the network 130 (not shown) to start the PXE booting process, and sends the command to the PXE server module 192 via the network 130. In certain embodiments, the initiation of the communication between the PXE client module 174 and the PXE server module 192 may be performed as described in FIG. 4, and is hereinafter not repeated.

When the PXE server module 192 receives the command from the PXE client module 174, at procedure 570, the PXE server module 192 retrieves a copy of the ISO image 199 from the memory 144 of the remote management computer 140. At procedure 572, the PXE server module 192 sends the retrieved copy of the ISO image 199 back to the PXE client module 174 through the network 130.

Upon receiving the copy of the ISO image 199, at procedure 574, the PXE client module 174 stores the copy of the ISO image 199 to the memory 114 (not shown in FIG. 5) of the host computer 110. At procedure 576, the PXE client module 174 responds to the instruction as described in procedure 564 by loading and executing the bootable system stored in the ISO image 199. In certain embodiments, the PXE client module 174 may notify the executed BIOS 170 to run the ISO image 199 in the memory 114. In certain embodiments, the ISO image 199 is an autoexecutable image, which may be automatically executed by the PXE client module 174 to run the flasher utility 198 stored in the ISO image 199.

Once the flasher utility 198 is executed, at procedure 578, the executed flasher utility 198 starts updating the BIOS image 170 stored in the BIOS chip 116 with the BIOS image 196 stored in the ISO image 199. Once the BIOS image 170 stored in the BIOS chip 116 is updated, the executed flasher utility 198 returns the control of the CPU 112 to the executed BIOS 170. At procedure 580, the executed BIOS 170 sends, through the network 130 (not shown), a completion signal to the management system 190 of the remote management computer 140, indicating that the BIOS updating process for the host computer 110 is complete.

Once the management system 190 receives the completion signal, the management system 190 may instruct the SP 120 to change the boot sequence data of the BIOS 170 of the host computer back to identify the storage device 118 as the bootable device. Referring to FIG. 5C, at procedure 581, the management system 190 sends an notification to the firmware 180 of the SP 120 to change the boot sequence data of the BIOS 170 back. Upon receiving the notification, at procedure 582, the firmware 180 instructs the boot sequence change module 182 to change the boot sequence data of the BIOS 170 of the host computer 110. At procedure 583, the boot sequence change module 182 generates an instruction to change the boot sequence data of the BIOS 170 to identify the storage device 118 as the bootable device. In certain embodiments, the instruction indicates the information of the storage device 118. At procedure 584, the boot sequence change module 182 sends the instruction back to the firmware 180.

At procedure 585, the firmware 180 sends the instruction to the IPMI module 184 for processing. Upon receiving the instruction, at procedure 586, the IPMI module 184 converts the instruction to generate the IPMI OEM message. At procedure 588, the IPMI module 184 sends the IPMI OEM message back to the firmware 180.

At procedure 590, the firmware 180 sends the IPMI OEM message representing the instruction to change the boot sequence data to the host computer 110 through the KCS interface 150. It should be appreciated that the IPMI OEM message can be sent to the host computer 110 through other interfaces, such as the USB interface 155 or any other system interfaces.

When the CPU 112 of the host computer 110 receives the IPMI OEM message representing the instruction, at procedure 592, the CPU 112 sends the IPMI OEM message to the IPMI application 172 for processing. Upon receiving the IPMI OEM message, at procedure 595, the IPMI application 172 converts the IPMI OEM message to generate the instruction to change boot sequence data, which is recognizable by the CPU 112. At procedure 598, the IPMI application 172 sends the instruction back to the CPU 112. Upon receiving the instruction, at procedure 600, the CPU 112 changes the boot sequence data of the BIOS 170, which is stored in the BIOS chip 116 of the host computer 110, to identify the storage device 118 as the bootable device. Thus, during the next booting process of the host computer 110, the BIOS 170 may boot from the storage device 118, which stores the OS 160.

Once the boot sequence data is changed, the firmware 180 of the SP 120 may send a command to reboot the host computer 110. At procedure 602, the firmware 180 generates the reboot command. At procedure 604, the firmware 180 sends the reboot command to the IPMI module 184 for processing. Upon receiving the reboot command, at procedure 606, the IPMI module 184 converts the reboot command to generate the IPMI OEM message. At procedure 608, the IPMI module 184 sends the IPMI OEM message back to the firmware 180.

At procedure 610, the firmware 180 sends the IPMI OEM message representing the reboot command to the host computer 110 through the KCS interface 150. It should be appreciated that the IPMI OEM message can be sent to the host computer 110 through other interfaces, such as the USB interface 155 or any other system interfaces.

When the CPU 112 of the host computer 110 receives the IPMI OEM message representing the reboot command, at procedure 612, the CPU 112 sends the IPMI OEM message to the IPMI application 172 for processing. Upon receiving the IPMI OEM message, at procedure 615, the IPMI application 172 converts the IPMI OEM message to generate the reboot command, which is recognizable by the CPU 112. At procedure 618, the IPMI application 172 sends the reboot command back to the CPU 112. Upon receiving the reboot command, at procedure 620, the CPU 112 restarts the host computer 110. Since the boot sequence data of the BIOS 170 now identifies the storage device 118 as the bootable device, the executed BIOS 170 at the CPU 112 boots with the OS 160 from the storage device 118.

It should be appreciated that the system 100 has a plurality of host computers 110 and SP's 120. When the remote management computer 140 discovers the host computers 110 and the SP's 120, the remote management computer 140 may determine that more than one of the host computers 110 have the SP's 120 and require BIOS update. In certain embodiments, the remote management computer 140 may select all of the host computers 110 that require BIOS update, and sequentially perform the remote BIOS update process as described in FIGS. 5A-5C for each of the selected host computers 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a host computer, comprising a basic input/output system (BIOS) chip storing a current BIOS image and boot sequence data; and
a service processor (SP) comprising a processor, a non-volatile memory and a system interface, and connected to the host computer via the system interface, wherein the non-volatile memory stores computer executable codes configured to, when executed at the processor,
receive a first notification from a remote management computer indicating that an ISO image exists at the remote management computer for the host computer to perform a remote booting process, wherein the host computer and the SP are respectively connected to the remote management computer via a network, and wherein the ISO image comprises a BIOS image and a flasher utility,
in response to the first notification, generate a first boot sequence change instruction, and send the first boot sequence change instruction to the host computer, such that the host computer changes the boot sequence data stored in the BIOS chip based on the first boot sequence change instruction to perform the remote booting process with the ISO image from the remote management computer, and
generate a first reboot command to reboot the host computer, and send the reboot command to the host computer, such that the host computer reboots based on the first reboot command and performs the remote booting with the ISO image to execute the flasher utility of the ISO image to update the current BIOS image stored in the BIOS chip with the BIOS image of the ISO image.

2. The system as claimed in claim 1, wherein the system interface is a standardized interface under an Intelligent Platform Management Interface (IPMI) standard, wherein the standardized interface comprises a keyboard controller style (KCS) interface, a system management interface chip (SMIC) interface, and a block transfer (BT) interface.

3. The system as claimed in claim 1, wherein the system interface is a universal serial bus (USB) interface.

4. The system as claimed in claim 1, wherein the SP is a baseboard management controller (BMC).

5. The system as claimed in claim 1, wherein the codes are configured to send the first boot sequence change instruction to the host computer by:
generating a first IPMI OEM message comprising the first boot sequence change instruction; and
sending the first IPMI OEM message to the host computer through the system interface.

6. The system as claimed in claim 1, wherein the codes are configured to send the first reboot command to the host computer by:
generating a second IPMI OEM message comprising the first reboot command; and
sending the second IPMI OEM message to the host computer through the system interface.

7. The system as claimed in claim 1, wherein the remote management computer is configured to
discover the host computer and the SP,
select the BIOS image and the flasher utility based on information of the host computer, and generate the ISO image comprising the BIOS image and the flasher utility, and
generate the first notification, and send the first notification to the SP.

8. The system as claimed in claim 1, wherein the host computer further comprises:
a storage device storing an operating system (OS);
a memory; and
a central processing unit (CPU), configured to load a copy of the current BIOS image from the BIOS chip to the memory and execute the current BIOS image as an executed BIOS;
wherein the executed BIOS, when executed at the CPU, is configured to
boot from a bootable device identified by the boot sequence data,
receive the first boot sequence change instruction from the SP,
change the boot sequence data based on the first boot sequence change instruction to identify a virtual remote booting media as the bootable device, wherein the virtual remote booting media is configured to perform the remote booting process,
receive the first reboot command from the SP,
reboot the host computer based on the first reboot command, and perform the remote booting process, and
generate a completion signal when the remote booting process is complete, and send the completion signal to the remote management computer via the network.

9. The system as claimed in claim 8, wherein prior to receiving the first boot sequence change instruction from the SP, the boot sequence data identifies the storage device as the bootable device.

10. The system as claimed in claim 8, wherein the remote management computer is configured to
receive the completion signal from the host computer via the network, and
in response to the completion signal, generate a second notification indicating the remote booting process being complete, and send the second notification to the SP via the network.

11. The system as claimed in claim 10, wherein the codes are further configured to
receive the second notification from the remote management computer, and
in response to the second notification, generate a second boot sequence change instruction, and send the second boot sequence change instruction to the host computer, such that the host computer changes the boot sequence data to identify the storage device as the bootable device.

12. The system as claimed in claim 11, wherein the executed BIOS is further configured to
receive the second boot sequence change instruction, and change the boot sequence data based on the second boot sequence change instruction to identify the storage device as the bootable device.

13. The system as claimed in claim 1, wherein the remote booting process is a preboot execution environment (PXE) booting process.

14. A method of remotely update a current basic input/output system (BIOS) image of a host computer, comprising:
receiving, at a service processor (SP), a first notification from a remote management computer indicating that an ISO image exists at the remote management computer for the host computer to perform a remote booting process, wherein the host computer and the SP are respectively connected to the remote management computer via a network, and wherein the ISO image comprises a BIOS image and a flasher utility;
in response to the first notification, generating, at the SP, a first boot sequence change instruction, and sending the first boot sequence change instruction to the host computer, such that the host computer changes boot sequence data stored in the current BIOS image based on the first boot sequence change instruction to perform the remote booting process with the ISO image from the remote management computer; and
generating, at the SP, a first reboot command to reboot the host computer, and send the reboot command to the host computer, such that the host computer reboots based on the first reboot command and performs the remote booting with the ISO image to execute the flasher utility of the ISO image to update the current BIOS image with the BIOS image of the ISO image.

15. The method as claimed in claim 14, wherein the SP is a baseboard management controller (BMC).

16. The method as claimed in claim 14, wherein the host computer comprises:
a storage device storing an operating system (OS);
a BIOS chip storing the current BIOS image and the boot sequence data;
a memory; and
a central processing unit (CPU), configured to load a copy of the current BIOS image from the BIOS chip to the memory and execute the current BIOS image as an executed BIOS;
wherein the executed BIOS, when executed at the CPU, is configured to
boot from a bootable device identified by the boot sequence data,
receive the first boot sequence change instruction,
change the boot sequence data based on the first boot sequence change instruction to identify a virtual remote booting media as the bootable device, wherein the virtual remote booting media is configured to perform the remote booting process,
receive the first reboot command,
reboot the host computer based on the first reboot command, and perform the remote booting process, and
generate a completion signal when the remote booting process is complete, and send the completion signal to the remote management computer via the network.

17. The method as claimed in claim 16, wherein the remote management computer is configured to
discover the host computer and the SP,
select the BIOS image and the flasher utility based on information of the host computer, and generate the ISO image comprising the BIOS image and the flasher utility,
generate the first notification, and send the first notification to the SP,
receive the completion signal from the host computer via the network, and
in response to the completion signal, generate a second notification indicating the remote booting process being complete, and send the second notification to the SP via the network.

18. The method as claimed in claim 17, further comprising:
receiving, at the SP, the second notification from the remote management computer, and
in response to the second notification, generating, at the SP, a second boot sequence change instruction, and sending the second boot sequence change instruction to the host computer, such that the host computer changes the boot sequence data to identify the storage device as the bootable device;
wherein the executed BIOS is further configured to
receive the second boot sequence change instruction, and
change the boot sequence data based on the second boot sequence change instruction to identify the storage device as the bootable device.

19. The method as claimed in claim 14, wherein the remote booting process is a preboot execution environment (PXE) booting process.

20. A non-transitory computer readable medium storing computer executable codes, wherein the codes, when executed at a processor of a service processor (SP), are configured to
receive a first notification from a remote management computer indicating that an ISO image exists at the remote management computer for a host computer to perform a remote booting process, wherein the host computer comprises a basic input/output system (BIOS) chip storing a current BIOS image and boot sequence data, wherein the host computer and the SP are respectively connected to the remote management computer via a network, and wherein the ISO image comprises a BIOS image and a flasher utility,
in response to the first notification, generate a first boot sequence change instruction, and send the first boot sequence change instruction to the host computer, such that the host computer changes the boot sequence data stored in the BIOS chip based on the first boot sequence change instruction to perform the remote booting process with the ISO image from the remote management computer, and
generate a first reboot command to reboot the host computer, and send the reboot command to the host computer, such that the host computer reboots based on the first reboot command and performs the remote booting with the ISO image to execute the flasher utility of the ISO image to update the current BIOS image stored in the BIOS chip with the BIOS image of the ISO image.

21. The non-transitory computer readable medium as claimed in claim 20, wherein the SP is a baseboard management controller (BMC).

22. The non-transitory computer readable medium as claimed in claim 20, wherein the host computer further comprises:
a storage device storing an operating system (OS);
a memory; and
a central processing unit (CPU), configured to load a copy of the current BIOS image from the BIOS chip to the memory and execute the current BIOS image as an executed BIOS;
wherein the executed BIOS, when executed at the CPU, is configured to boot from a bootable device identified by the boot sequence data, receive the first boot sequence change instruction from the SP, change the boot sequence data based on the first boot sequence change instruction to identify a virtual remote booting media as the bootable device, wherein the virtual remote booting media is configured to perform the remote booting process, receive the first reboot command from the SP, reboot the host computer based on the first reboot command, and perform the remote booting process, and generate a completion signal when the remote booting process is complete, and send the completion signal to the remote management computer via the network.

23. The non-transitory computer readable medium as claimed in claim 22, wherein the remote management computer is configured to discover the host computer and the SP, select the BIOS image and the flasher utility based on information of the host computer, and generate the ISO image comprising the BIOS image and the flasher utility, generate the first notification, and send the first notification to the SP, receive the completion signal from the host computer via the network, and in response to the completion signal, generate a second notification indicating the remote booting process being complete, and send the second notification to the SP via the network.

24. The non-transitory computer readable medium as claimed in claim 23, wherein the codes are further configured to receive the second notification from the remote management computer, and in response to the second notification, generate a second boot sequence change instruction, and send the second boot sequence change instruction to the host computer, such that the host computer changes the boot sequence data to identify the storage device as the bootable device, wherein the executed BIOS is further configured to receive the second boot sequence change instruction, and change the boot sequence data based on the second boot sequence change instruction to identify the storage device as the bootable device.

25. The non-transitory computer readable medium as claimed in claim 20, wherein the remote booting process is a preboot execution environment (PXE) booting process.

* * * * *